(12) United States Patent
Gourraud

(10) Patent No.: US 6,711,156 B1
(45) Date of Patent: Mar. 23, 2004

(54) SYSTEM AND METHOD FOR PROVIDING ENHANCED USER-SERVICE INTERACTION IN AN INTEGRATED TELECOMMUNICATIONS NETWORK

(75) Inventor: Christophe Gourraud, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/531,849

(22) Filed: Mar. 20, 2000

(51) Int. Cl.⁷ .......................... H04L 12/66; H04L 12/28
(52) U.S. Cl. ........................ 370/352; 370/410
(58) Field of Search ................... 370/352, 353, 370/356, 410, 467, 522, 466, 401

(56) References Cited

U.S. PATENT DOCUMENTS

| | | | | |
|---|---|---|---|---|
| 5,519,772 A | | 5/1996 | Akman et al. ............... | 379/265 |
| 6,128,379 A | * | 10/2000 | Smyk .......................... | 379/230 |
| 6,282,281 B1 | * | 8/2001 | Low ............................ | 379/230 |
| 6,453,034 B1 | * | 9/2002 | Donovan et al. ......... | 379/220.01 |
| 6,470,010 B1 | * | 10/2002 | Szviatovszki et al. ...... | 370/356 |
| 6,507,647 B1 | * | 1/2003 | Mandalia .................... | 379/219 |

FOREIGN PATENT DOCUMENTS

| | | |
|---|---|---|
| EP | 0924942 | 6/1999 |
| EP | 0964567 | 12/1999 |
| WO | WO 96/38018 | 11/1996 |
| WO | WO 97/22209 | 6/1997 |
| WO | WO 98/36542 | 8/1998 |
| WO | WO 98/48542 | 10/1998 |
| WO | WO 00/79741 | 12/2000 |
| WO | WO 00/79756 | 12/2000 |

\* cited by examiner

*Primary Examiner*—Min Jung
*Assistant Examiner*—Andy Lee
(74) *Attorney, Agent, or Firm*—Smith & Danamraj, PC

(57) ABSTRACT

A system and method of providing enhanced user-service interactivity between a user and a service in an integrated telecommunications network including an IP-based packet-switched (PSN) portion and a circuit-switched network (CSN) portion. The network supports IN-based service architecture for providing Value-Added Services (VAS) to the user who interacts with the network by operating an IP-compliant terminal. The network includes a switching node that governs call setup, call control, and service access and switching with respect to the user. A Service Control Point (SCP) is included in the network for the provisioning of VAS to the user. The SCP node includes a logic portion for determining whether an interaction between the user and an Intelligent Peripheral is to be effectuated when a service is invoked and an appropriate service trigger is transmitted from the switching node.

16 Claims, 3 Drawing Sheets

… … … . … … … . . .

SYSTEM AND METHOD FOR PROVIDING ENHANCED USER-SERVICE INTERACTION IN AN INTEGRATED TELECOMMUNICATIONS NETWORK

BACKGROUND OF THE INVENTION

1. Technical Field of the Invention

The present invention relates to integrated telecommunication systems and, more particularly, to a system and method for providing enhanced user-service interaction capability in an integrated telecommunications network. The exemplary integrated telecommunications network may comprise a packet-switched network (PSN) coupled to a circuit-switched network (CSN). Also, the network may comprise a PSN portion only. For example, a network portion using the Internet Protocol (IP) may comprise such a PSN portion. Furthermore, for instance, the CSN portion may comprise a wireless telephony network portion having a service architecture that is derived from, or based upon, the Intelligent Network (IN) service architecture.

2. Description of Related Art

Coupled with the phenomenal growth in popularity of the Internet, there has been a tremendous interest in using packet-switched network (PSN) infrastructures (e.g., those based on IP addressing) as a replacement for, or as an adjunct to, the existing circuit-switched network (CSN) infrastructures used in today's telephony. From the network operators' perspective, the inherent traffic aggregation in packet-switched infrastructures allows for a reduction in the cost of transmission and the infrastructure cost per end-user. Ultimately, such cost reductions enable the network operators to pass on the concomitant cost savings to the end-users.

Some of the market drivers that impel the existing Voice-over-IP (VoIP) technology are: improvements in the quality of IP telephony; the Internet phenomenon; emergence of standards; cost-effective price-points for advanced services via media-rich call management, et cetera. Some of the emerging standards in this area are the well known H.323 protocol, developed by the International Telecommunications Union (ITU), Session Initiation Protocol (SIP) or Internet Protocol Device Control (IPDC) by the Internet Engineering Task Force (IETF), or Simple/Media Gateway Control Protocol (SGCP or MGCP). Using these IP standards, devices such as personal computers can interoperate seamlessly in a vast inter-network, sharing a mixture of audio, video, and data across all forms of packet-based networks which may interface with circuit-switched network portions.

Because of the availability of interoperable coupling mechanisms between the PSN and CSN portions, it is now feasible to implement an integrated VoIP telecommunications network wherein advanced services, commonly referred to as Value-Added Services (VAS), may be provisioned using the well known Intelligent Network (IN) service architecture. Those skilled in the art should readily realize that there exist tremendous incentives, economic as well as infrastructure-based, for utilizing the existing IN or IN-based service architecture with respect to the provisioning of VAS within the IP telephony framework.

As is well known, certain services provided in the context of the IN architecture may require an interaction with the user/subscriber. In current CSN implementations, a Service Resource Function (SRF) is typically embodied as an Intelligent Peripheral and the user-service interaction is effectuated via the Intelligent Peripheral which involves, for example, interactive voice responses, keypad inputs, et cetera, from the user. Services requiring such interactions are performed through a Service Control Point (SCP) which instructs an appropriate switching node serving the user (e.g., a Mobile Switching Center (MSC)) to establish a connection between the user's device (e.g., a telephone) and the Intelligent Peripheral, whereupon the user-service interactions are subsequently carried out.

It should be appreciated upon reference hereto that the emergence of VoIP networks and devices such as, e.g., Smart IP phones, Internet phones, Information Appliances, et cetera, renders the above-mentioned user-service interaction methodology not only inappropriate but also exceedingly limited. Furthermore, the network-centric approach of the IN architecture may be challenged by the burgeoning IP-based alternatives for service provisioning.

Based upon the foregoing, it should be apparent that there is a need for a more robust user-service interaction scheme within the framework of IP telephony which allows enhanced mechanisms therefor while still leveraging the existing IN service architecture. The present invention advantageously provides such a solution.

SUMMARY OF THE INVENTION

Accordingly, the present invention is directed, in one aspect, to a method of providing enhanced user-service interactivity between a user and a service within a telecommunications network that supports IN or IN-based service architectures. The network comprises a switching node that embodies Call Control Functionality and Service Switching Functionality, a service logic node preferably implemented as a Service Control Point (SCP), and an Intelligent Peripheral providing Service Resource Functionality with respect to invoked services. An Internet Protocol (IP)-based terminal/appliance is available for the user to interact with the telecommunications network. The method of the present invention commences with receiving a call in the switching node with respect to the user. A service trigger, associated with the service to which the user has a subscription, is thereafter transmitted by the switching node to the service logic node via a suitable service message. Upon determining that an interaction between the user and the Intelligent Peripheral is to be effectuated, the service logic node forwards an instruction to the switching node including an IP-compliant address of the Intelligent Peripheral. In a presently preferred exemplary embodiment of the present invention, a Uniform Resource Locator (URL) associated with the Intelligent Peripheral is provided as its IP-compliant address.

The IP-compliant address of the Intelligent Peripheral is subsequently forwarded to the terminal by the switching node. By engaging in local processing on the terminal, the user establishes a session between the terminal and the Intelligent Peripheral using the IP-compliant address of the Intelligent Peripheral. Subsequently, the user may interact with the Intelligent Peripheral based on the service invoked in the service logic node. Preferably, such interactions include World Wide Web (WWW or the "Web") mechanisms such as, e.g., those involving Java inputs in multimedia sessions, etc.

In another aspect, the present invention is directed to an integrated telecommunications network that allows enhanced user-service interactivity between a user and a service to which the user has a subscription, the user operating an IP-compliant terminal/appliance disposed in an IP-based PSN portion. Preferably, the telecommunications network supports an IN-based service architecture and includes a switching node that governs call setup, call control, and service access and switching with respect to the user. An SCP node is included for providing VAS to the user. The SCP node includes a logic portion for determining whether an interaction between the user and an Intelligent Peripheral is to be effectuated when a service is invoked and when an appropriate service trigger is transmitted from the switching node. Also included in the SCP is a logic portion for generating an instruction to the switching node including a URL of the Intelligent Peripheral. The terminal includes appropriate processor means for local processing that allows accessing of the Intelligent Peripheral using the URL received from the switching node. The user may then interact with the service via the Intelligent Peripheral using known Web-based mechanisms, depending on the particular service invoked.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF EMBODIMENTS

Figure 1A:
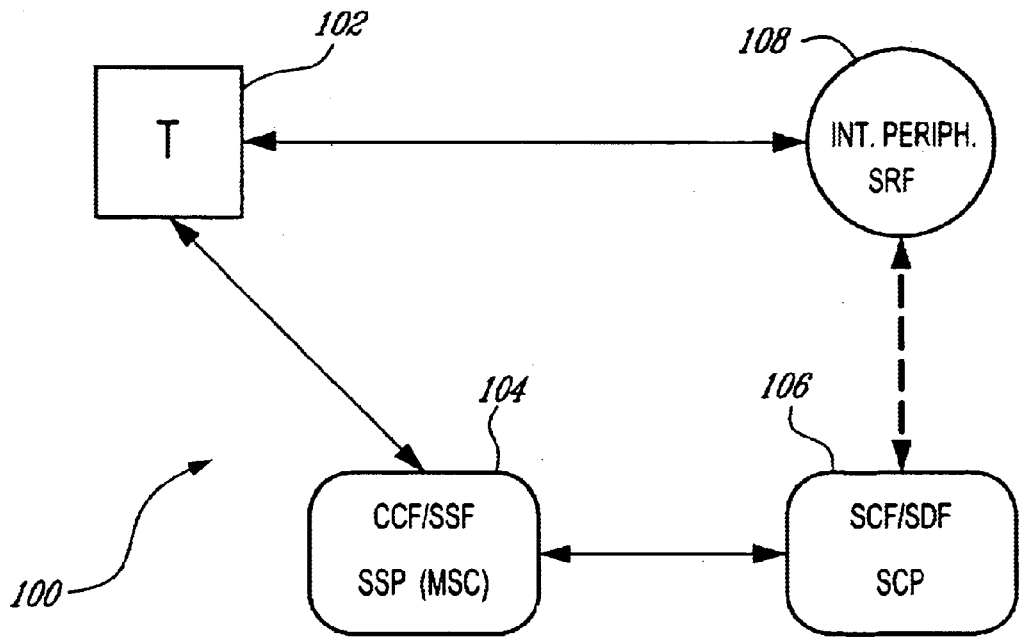
FIGS. 1A and 1B (Prior Art) depict a conventional user-service interaction scheme in a telecommunications network.

In the drawings, like or similar elements are designated with identical reference numerals throughout the several views, and the various elements depicted are not necessarily drawn to scale. Referring now to FIG. 1A, depicted therein is a typical circuit-switched telecommunications network 100 that provides user-service interaction in a conventional manner. A switching node 104, referred to as a Service Switching Point (SSP) and comprising a Call Control Function (CCF) and a Service Switching Function (SSF), is provided in the telecommunications network 100 for call control and service switching purposes with respect to a user operating a communications terminal 102 such as, e.g., a phone. Those of ordinary skill in the art will recognize that in the context of a conventional wireless telecommunications network, the SSP node 104 is preferably realized as a Mobile Switching Center (MSC) that serves the user (i.e., the mobile subscriber).

In accordance with the IN service architecture, a Service Control Point (SCP) 106 comprising a Service Control Function (SCF) and a Service Data Function (SDF) is provided in the telecommunications network 100 for executing appropriate service logic portions upon invocation of a service with respect to the user. For services requiring user interaction, e.g., interactive voice response (IVR) services, services requiring keypad input via terminal 102, et cetera, a Service Resource Function (SRF) is provided as an Intelligent Peripheral 108 within the network 100. For example, a call center or a customer service center may be implemented in this manner.

Figure 1B:
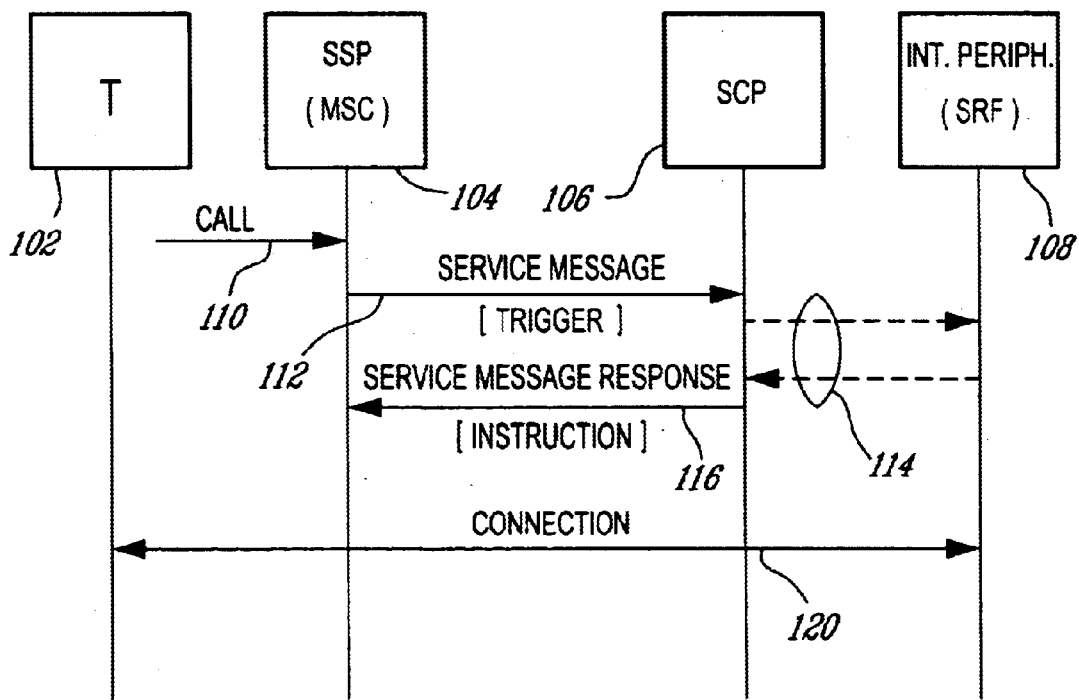

FIG. 1B illustrates a message flow diagram for effectuating a conventional user-service interaction methodology in the telecommunication network 100. When a call 110 is received in the SSP (MSC) 104, an appropriate service trigger is forwarded via a service message 112 to the SCP 106 for executing a service logic portion associated with the service. In response, the SCP 106 determines whether the invoked service requires user interaction and, if so, establishes a bidirectional connection path 114 with the Intelligent Peripheral 108 embodying a suitable Service Resource Function. Thereafter, the SCP 106 sends a service message response 116 to the SSP 104 which includes an instruction to establish a connection path between the terminal 102 and the Intelligent Peripheral 108 for allowing appropriate user-service interactions. Accordingly, the SSP 104 establishes a bidirectional path 120 between the terminal 102 and the Intelligent Peripheral 108. Subsequent interactions between the user and the service are performed through the Intelligent Peripheral 108 using, for example, recorded messages transmitted to the user and appropriate voice responses or key inputs from the user.

Figure 2A:
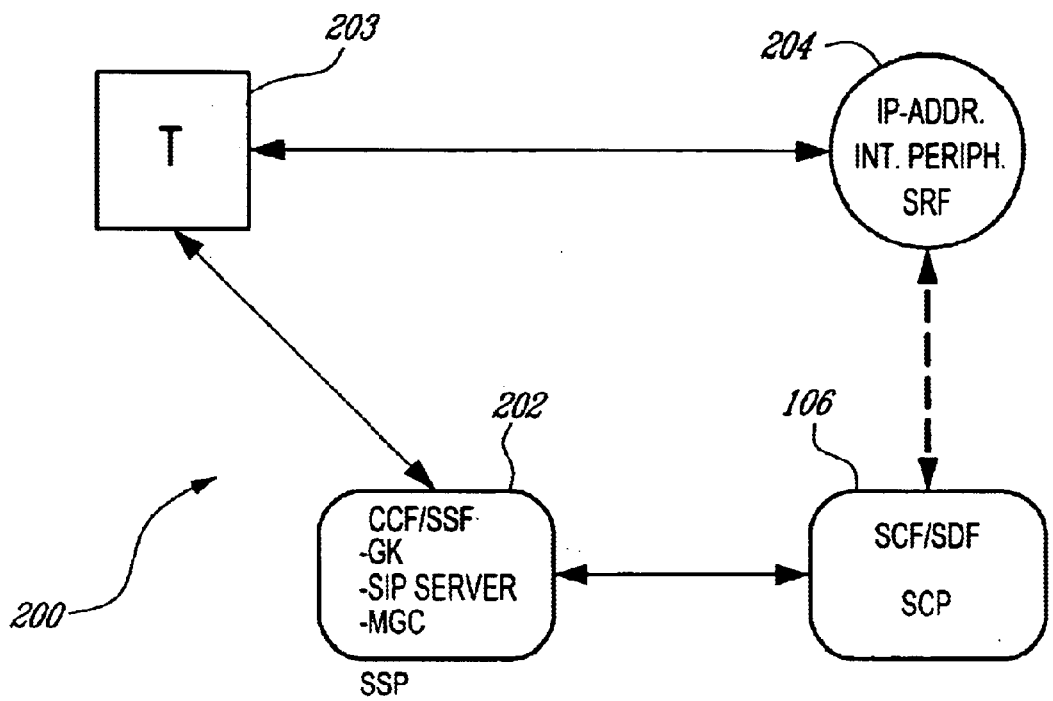
FIGS. 2A and 2B depict a presently preferred exemplary embodiment of a user-service interaction scheme provided in accordance with the teachings of the present invention.

FIG. 2A depicts a PSN portion 200 operable with a suitable IP-based telephony standard, e.g., H.323, SIP, et cetera, wherein the teachings of the present invention may be advantageously practiced. Those skilled in the art should realize upon reference hereto that the PSN portion 200 may preferably be coupled to a wireless CSN portion in an integrated telecommunications network arrangement. An IP-compatible terminal 203 (e.g., an Internet phone, Smart phone, Information Appliance, and the like) is available to users for placing and receiving voice and data calls. In addition, various Value-Added Services (e.g., video on demand services, et cetera) may also be accessed using the IP-terminal 203. A suitable IP-compatible SSP node 202 (i.e., an IP call server implementing an IN SSP logic) that embodies Call Control and Service Switching Functions (e.g., an H.323 gatekeeper, SIP redirect/proxy server, a Media Gateway Controller (MGC), and the like) is included in the network 200 for call setup, call control, and service access and switching. Further, an IP-compatible Intelligent Peripheral 204 embodying a suitable Service Resource Function is included in the network arrangement shown herein.

Continuing to refer to FIG. 2A, communication between the entities of the network portion 200 may be effectuated in accordance with the following:

T 203⇆SSP 202: IP using IP telephony protocols (e.g., SIP, H.323, etc.);

SSP 202⇆SCP 106: IN, with the possibility of being over IP;

SCP 106⇆SRF 204: Usually proprietary protocols, with the possibility of being over IP; and T 203⇆SRF 204: several options such as, e.g., HyperText Transfer Protocol (HTTP), Java RMI, Corba, usable on the Web.

Figure 2B:
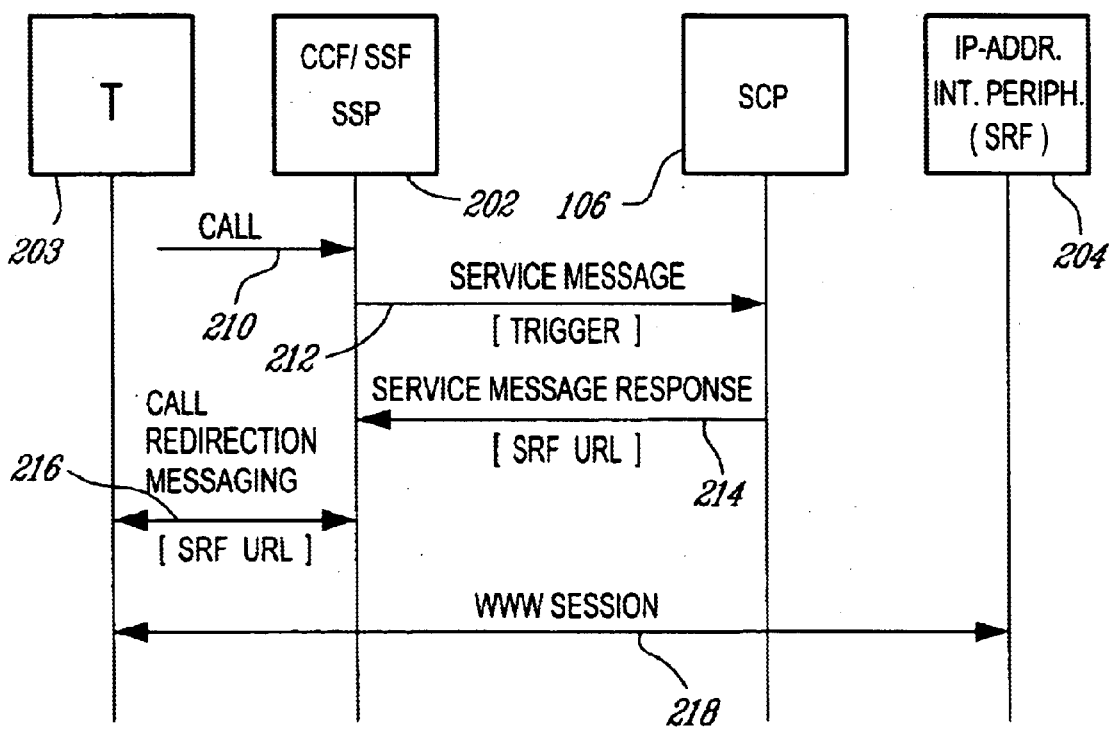

Referring now to FIG. 2B, depicted therein is a message flow diagram for effectuating a user-service interaction scheme in the IP-based PSN portion 200 in accordance with the teachings of the present invention. When a call 210 is received in the IP-SSP node 202, an appropriate service trigger is forwarded via a service message 212 to the SCP 106 for executing a service logic portion associated with the service.

In accordance with the teachings of the present invention, the service logic portions are appropriately modified such that when the SCP determines that the invoked service requires user interaction, instead of instructing the IP-SSP node 202 to establish a connection between the terminal 203 and the Intelligent Peripheral 204, an instruction to redirect the call to an appropriate IP-compliant address of the Intelligent Peripheral, e.g., its Uniform Resource Locator (URL), is included in a service message response 214 sent by the SCP 106 to the IP-SSP 202. Preferably, the SCP node 106 need not interact with the IP-based Intelligent Peripheral 204 in this regard, although in some implementations such interactions may be allowed.

Thereafter, the IP-SSP instructs the IP-compliant terminal 203 to redirect its call to the URL via suitable messaging 216 between the IP-SSP node 202 and the terminal 203. Local processing available on the terminal can then automatically access the Web page corresponding to the IP-based Intelligent Peripheral 204. Thereafter, known WWW mechanisms 218, which in some embodiments may include Wireless Application Protocol (WAP) or other multimedia, may be used for effectuating appropriate bidirectional user-service interactions.

It should be apparent to those skilled in the art that whereas in the H.323-based networks the URL may typically be required to be transported from the SSF to the terminal as an encapsulated parameter in an appropriate H.323 signaling message, IETF-based IP telephony protocols, e.g., SIP, already support the requisite transfer mechanisms in their native signaling.

Figure 3:
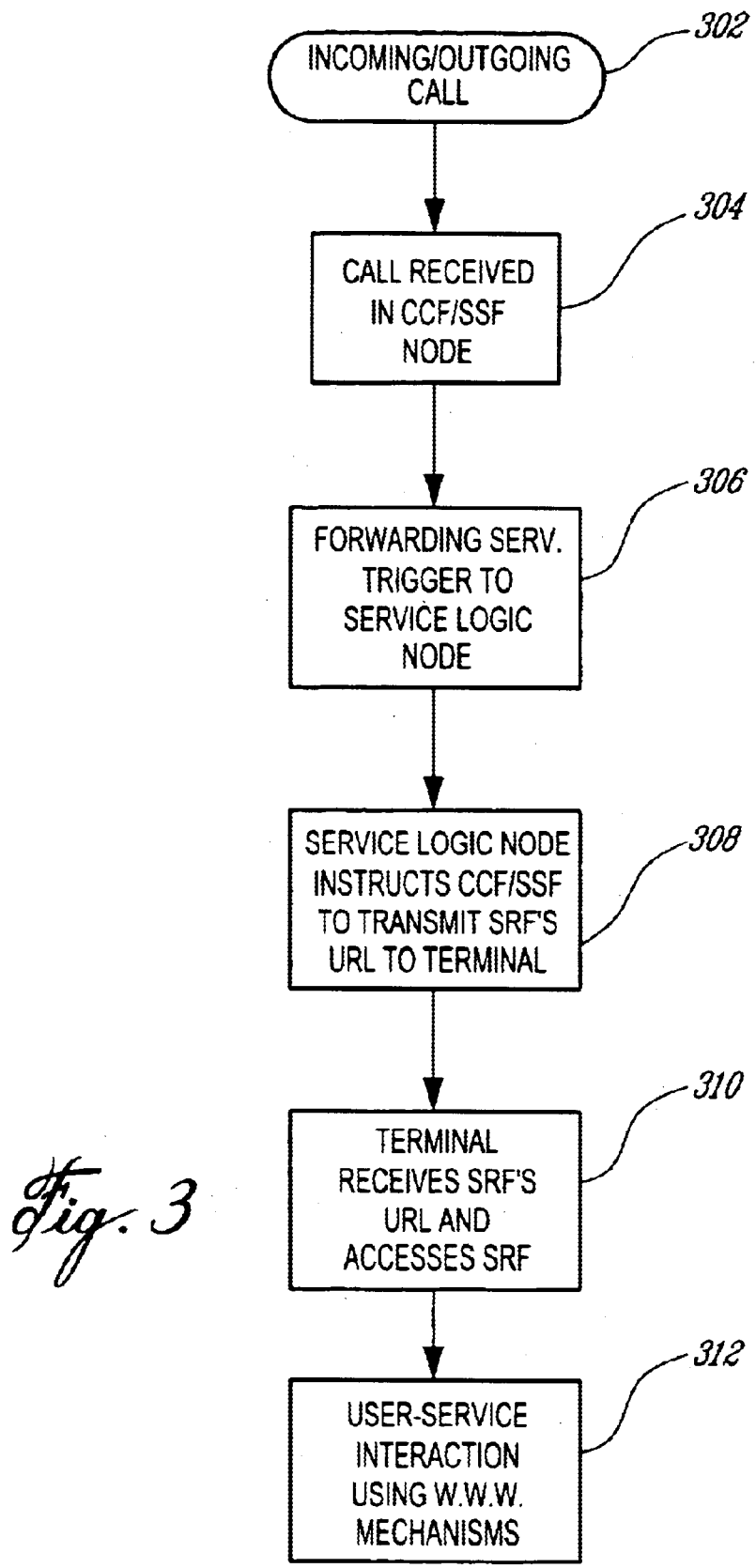
FIG. 3 is a flow diagram of an exemplary embodiment of the user-service interaction method provided in accordance with the teachings of the present invention.

FIG. 3 depicts a flow chart of the steps involved in an exemplary embodiment of the user-service interaction method of the present invention described hereinabove. The method starts with an originating or terminating call with respect to the user operating an IP terminal disposed in a PSN or a PSN portion within an integrated telecommunications network (step 302). When the call is received in the switching node (step 304), an appropriate trigger is forwarded to the service logic node (i.e., the SCP) via suitable messaging (step 306). Thereafter, upon determining that a user-service interaction is required with respect to the service invoked, the service logic node instructs the switching node to transmit the URL associated with the IP-based Intelligent Peripheral to the IP terminal (step 308). Preferably by engaging in local processing which supports Web browsing functionality on the terminal, the user may then access the IP-based Intelligent Peripheral using the URL (step 310) accordingly. Subsequently, various advanced interactions using the WWW mechanisms (e.g., WAP or Java inputs in multimedia sessions, et cetera) may be effectuated between the user and the service (step 312). In addition, conventional keypad inputs may also be available for the user-service interactions.

Based upon the foregoing, it should be readily appreciated by those skilled in the art that the present invention provides an advantageous solution for providing enhanced user-service interaction capability in integrated telecommunications networks that leverages the existing IN-based service architecture. Because of the IP capability in the network, a plethora of communication appliances/devices may be used in accordance herewith: Information Appliances, personal/laptop/palmtop computers, Personal Digital Assistants, Smart phones, TDMA/CDMA/GSM mobile phones with IP addressability, et cetera.

Moreover, by utilizing the teachings of the present invention, the WIN/IN service logic base that is already installed and market-tested may continue to be re-used even as VoIP network architectures come into existence. Those of ordinary skill in the art should realize that significant incentives exist for network operators to re-use the expensive legacy SCP nodes as they migrate towards integrating the cellular infrastructures with IP-based PSNs. Also, IP telephony SSPs do not have to mimic the more complex behavior of a circuit-switched SSP, as its functionality is achieved by having to forward a redirection request (via IP addressing) to the originating terminal. Because of IP interactivity, the SRF can evolve and support more attractive and interactive interfaces towards the end-user, based on Web-based graphics and multimedia.

Further, it is believed that the operation and construction of the present invention will be apparent from the foregoing Detailed Description. In addition, two specific scenarios are set forth below to particularly exemplify the present invention in practice.

The end-user dials or enters a phone number which connects the user to a call center: The B-number triggers the SCP which requests the SSP to redirect the call to the call center Web page. The SSP sends a call redirection message to the terminal which automatically interprets it and accesses the Web page. The Web server can implement the redirection logic of the SCP and provide the end-user with the possibility of contacting the operator, for example, by a clicking on an icon. Alternatively, the Web server may require the intelligent logic from the SCP (i.e., selecting the operator), but the end-user interfaces with it (i.e., the Web server) for the redirection.

The end-user dials or enters a B-number for a Video-On-Demand Service: The B-number triggers the SCP which instructs the SSP to redirect the call to a Web page. The SSP asks the terminal for redirection, and the terminal automatically accesses the video selection Web page. Using hyperlinks etc., the video selection page can ultimately direct the user to the video server (i.e., no need for SCP intervention), and Web technologies (e.g., Real Video) can be used to watch the movie.

Those skilled in the art should appreciate that while the method and system shown and described in the foregoing have been characterized as being presently preferred, with the exemplary embodiments being illustrative rather than restrictive, it should be readily understood that various changes and modifications could be made therein without departing from the scope of the present invention as set forth in the following claims.

What is claimed is:

1. A method of providing user-service interactivity between a user and a service within a telecommunications network having a switching node, a service logic node and an Intelligent Peripheral, wherein the user interacts with the telecommunications network using an Internet Protocol (IP)-based terminal, the method comprising the steps of:

receiving a call in the switching node with respect to the user;

transmitting a service trigger associated with the service to which the user has a subscription, from the switching node to the service logic node;

determining in the service logic node that an interaction between the user and the Intelligent Peripheral is to be effectuated;

responsive to the determining step, forwarding an instruction by the service logic node to the switching node, the instruction including an IP-compliant address of the Intelligent Peripheral;

forwarding the IP-compliant address of the Intelligent Peripheral to the terminal by the switching node;

establishing a session between the terminal and the Intelligent Peripheral using the IP-compliant address of the Intelligent Peripheral; and interacting with the Intelligent Peripheral based on the service invoked in the service logic node.

2. The method of providing user-service interactivity between a user and a service within a telecommunications network as set forth in claim 1, wherein the call comprises a voice call and the switching node is selected from a group consisting of: an H.323 gatekeeper, a Session Initiation Protocol (SIP) redirect server, and a Media Gateway Controller.

3. The method of providing user-service interactivity between a user and a service within a telecommunications network as set forth in claim 1, wherein the call comprises a data call and the switching node is selected from a group consisting of: an H.323 gatekeeper, a Session Initiation Protocol (SIP) redirect server, and a Media Gateway Controller.

4. The method of providing user-service interactivity between a user and a service within a telecommunications network as set forth in claim 1, wherein the call comprises a multimedia call and the switching node is selected from a group consisting of: an H.323 gatekeeper, a Session Initiation Protocol (SIP) redirect server, and a Media Gateway Controller.

5. The method of providing user-service interactivity between a user and a service within a telecommunications network as set forth in claim 1, wherein the IP-compliant address of the Intelligent Peripheral comprises a Uniform Resource Locator.

6. The method of providing user-service interactivity between a user and a service within a telecommunications network as set forth in claim 1, wherein the step of interacting comprises inputting Java information by the user via the terminal.

7. The method of providing user-service interactivity between a user and a service within a telecommunications network as set forth in claim 1, wherein the step of interacting comprises a World Wide Web (WWW) mechanism effectuated by the user.

8. A telecommunications network that provides user-service interactivity between a user and a service to which the user has a subscription, the user operating an Internet Protocol (IP)-compliant terminal, said network comprising:

a switching node governing call setup, call control, and service access and switching with respect to the user;

a Service Control Point (SCP) including a logic portion for determining whether an interaction between the user and an Intelligent Peripheral is to be effectuated with respect to the service invoked;

means in the SCP for generating an instruction to the switching node including an IP-compliant address of the Intelligent Peripheral; and means in the terminal to access the Intelligent Peripheral using the IP-compliant address received from the switching node.

9. The telecommunications network that provides user-service interactivity between a user and a service as set forth in claim 8, wherein the switching node comprises an H.323 gatekeeper.

10. The telecommunications network that provides user-service interactivity between a user and a service as set forth in claim 8, wherein the switching node comprises a Session Initiation Protocol (SIP) server.

11. The telecommunications network that provides user-service interactivity between a user and a service as set forth in claim 8, wherein the switching node comprises a Media Gateway Controller.

12. The telecommunications network that provides user-service interactivity between a user and a service as set forth in claim 8, wherein the means in the terminal to access the Intelligent Peripheral using the IP-compliant address received from the switching node comprises a World Wide Web (WWW) mechanism.

13. The telecommunications network that provides user-service interactivity between a user and a service as set forth in claim 8, wherein the interaction between the user and the service comprises Java inputs effected by the user via the terminal.

14. The telecommunications network that provides user-service interactivity between a user and a service as set forth in claim 8, wherein the switching node comprises a Session Initiation Protocol (SIP) redirect server.

15. The telecommunications network that provides user-service interactivity between a user and a service as set forth in claim 8, wherein the interaction between the user and the service comprises multimedia inputs effected by the user via the terminal.

16. The telecommunications network that provides user-service interactivity between a user and a service as set forth in claim 8, wherein the IP-compliant address comprises a Uniform Resource Locator (URL) of the Intelligent Peripheral.

* * * * *